United States Patent [19]

Enander

[11] Patent Number: 5,067,652
[45] Date of Patent: Nov. 26, 1991

[54] SUPPLEMENTAL VEHICLE HEATING METHOD AND APPARATUS WITH LONG HEATING CYCLE

[76] Inventor: Harold R. Enander, 23451 E. 156 Ave., Brighton, Colo. 80601

[21] Appl. No.: 486,686

[22] Filed: Mar. 1, 1990

Related U.S. Application Data

[62] Division of Ser. No. 318,392, Mar. 2, 1989.

[51] Int. Cl.$^5$ ............................................. B60H 1/02
[52] U.S. Cl. ................................. 237/81; 237/12.3 B; 237/2 A; 165/1
[58] Field of Search ..................... 237/12.3 A, 12.3 B, 237/12.3 C, 81; 126/101, 110 A, 110 B, 110 C; 165/1, 41, 42

[56] References Cited

PUBLICATIONS

Van Wylen, Thermodynamics, 1959 pp. 99 and 100.

Primary Examiner—Henry A. Bennet
Attorney, Agent, or Firm—Rothgerber, Appel, Powers & Johnson

[57] ABSTRACT

An auxiliary burner provides supplemental thermal energy to a vehicle having a room and domestic water to be heated. The auxiliary burner operates efficiently at a rated thermal output when it is operated for at least the duration of a minimum operational cycle. A reservoir contains heat transfer liquid having a selected thermal energy storage capacity, measured by the amount of thermal energy required to heat the liquid from a minimum to a maximum operating temperature. The heat transfer liquid receives heat from the auxiliary burner. The thermal energy storage capacity is selected so that the auxiliary burner must operate at its rated thermal output for at least the duration of the minimum desired operational cycle to provide the selected thermal energy storage capacity to the reservoir. Methods of the present invention include heating the reservoir containing the heat transfer liquid having the selected thermal energy storage capacity by operating the auxiliary burner at the rated thermal output for at least the duration of the minimum desired operational cycle. With the heat transfer liquid in the thermal reservoir at the maximum operating temperature and the auxiliary burner off, heat is transferred from the thermal reservoir to meet thermal demands for heated room air and domestic hot water. These demands decrease the temperature of the heat transfer liquid to the minimum operating temperature, whereupon the auxiliary burner is operated for at least the duration of the minimum desires operational cycle to raise the temperature of the heat transfer liquid to the maximum operating temperature.

6 Claims, 7 Drawing Sheets

SUPPLEMENTAL VEHICLE HEATING METHOD AND APPARATUS WITH LONG HEATING CYCLE

REFERENCE TO PARENT APPLICATION

This application is a division of application of H. R. Enander, Ser. No. 07/318,392, filed Mar. 2, 1989, For SUPPLEMENTAL VEHICLE HEATING METHOD AND APPARATUS WITH LONG HEATING CYCLE.

BACKGROUND OF THE INVENTION

1. Field of the Invention

This invention relates to providing supplemental thermal energy to vehicles having living areas, and more particularly to providing supplemental heat to over-the-road and marine craft having rooms and domestic water to be heated.

2. Discussion of Prior Art

Vehicles of many types have been used to provide temporary living or working quarters. These include self-propelled over-the-road vehicles, such as so-called recreational vehicles powered by internal combustion engines. Also, self-propelled vans have been used as mobile work spaces, such as for providing medical services at remote or movable locations in a city. Other self-propelled vehicles include boats in which internal combustion engines provide the primary power source. Other non-self-propelled vehicles, such as trailers, have been used to provide shelter for temporary living, such as for vacation or recreation. Also, trailers are used to provide space for performing work, such as at construction sites or performing atmospheric sensing at remote locations.

All of these vehicles are characterized by the need to provide heated space, in the form of at least one room. In general, many separate rooms or work areas are provided. Also, sanitary facilities are provided in such vehicles, and include plumbing fixtures such as sinks, showers, and toilets that use domestic water, especially heated water.

The term "vehicle" is used herein to refer to all of these types of vehicles, whether or not self-propelled and whether an over-the-road or water vehicle, so long as there is a space to be heated in the vehicle and/or a requirement that heated domestic water be available for use. The term "vehicle" may also include the above type of vehicle that is also provided with a main power source, such as an internal combustion engine, that has a primary function of propelling the vehicle on land or water. Customarily, those main power sources are heated when not in operation, so that they will start readily when the vehicle is to be moved.

The main power source of such vehicle is turned off when the vehicle arrives at the destination, and reliance is placed on a supplemental source of thermal energy. Such supplemental thermal energy sources include diesel-fired and gasoline-fired burners, such as those disclosed in U.S. Pat. Nos. 2,726,042 and 3,877,639. These supplemental burners transfer heat to a small mass or volume of liquid in a thin jacket that surrounds the burner's combustion chamber. The thin jacket substantially limits the mass and volume of liquid that is in heat transfer relationship with the combustion chamber.

In applicant's experience with such burners, the liquid volume in the thin jackets is only about 0.26 gallons, and a typical system, including conduits and liquid-to-air heat exchangers, may only have a two and one-half gallon liquid volume, including the 0.26 gallons in the thin jackets. Further, such mass and volume of the liquid in the thin jackets are not selected according to the operating characteristics of the auxiliary burners.

Other systems used with such vehicles include relatively small domestic hot water tanks, such as those holding eleven gallons. The domestic water is heated by a heat exchanger that uses energy from the main engine. Alternatively, the domestic water is heated when the supplemental burner is operated for heating room air. The operation of the burner is not generally controlled in response to the demand for hot domestic water. For example, U.S. Pat. No. 236,849 issued in 1881 discloses pipes that supply heat to both a domestic water tank and radiators for room air heating.

SUMMARY OF THE INVENTION

In applicant's experience, there are problems with such supplemental burners. These problems are severe when attempts are made to divide the hot liquid from the thin jacket into separate heating zones, and to supply heat to less than all of the zones at any given moment. The burners inherently have a three-stage operational cycle, including an initial, relatively inefficient, start-up stage in which thermal energy is used to heat the thermal mass of the burner, the combustion chamber and the exhaust system. The start-up is characterized by carbon build up on the inside walls of the combustion chamber due to incomplete combustion.

Once the combustion chamber has reached a normal, steady-state operating temperature (e.g., after three minutes of operation in the start-up stage—see $t_0$ to $t_3$ in FIG. 6), the burner operates more efficiently and starts to burn the deposited carbon off the walls of the combustion chamber. This optimum stage efficiently converts the fuel to thermal energy that is transferred to the liquid in the thin jacket (see $t_3$ to $t_{10}$ in FIG. 6).

When a condition to be controlled occurs, the burner is shut off (see shut off at time $t_{10}$ in FIG. 6), and a purge stage starts. When there is thermal demand after the burner is shut off, the purge stage continues for less than the duration (2.5 minutes) of the normal purge stage and is thus abbreviated because a low limit temperature $T_L$ is reached before the purge stage ends. In the purge stage, air continues to flow through the combustion chamber and the liquid continues to flow in the thin jacket.

These prior art burners have a British thermal unit (BTU) output sufficient to supply adequate heat to all of the zones at the same time. In applicant's experience, with a typical flow rate of 4.5 gallons per minute (gpm) through the thin jacket, the liquid temperature will increase up to 18° F. in one pass through the thin jacket in the optimum stage of operation. In the typical prior art example illustrated in FIG. 6, there are a total of two and one-half gallons of liquid in the thin jacket, conduits and heat exchangers, and the thin jacket weighs 15 pounds. The normal factory temperature differential between $T_M$ and $T_L$ is 15° F. In this situation, when less than all of the zones are operational or "active," the liquid flowing through the liquid-to-air heat exchangers in the active zones will generally not decrease the liquid temperature by the full 18° F. amount. As a result, as the liquid circulates through the one active zone (or through less than all of the zones) and through the thin jacket, applicant has observed that the output temperature (see arrow $T_{LO}$ in FIG. 6) of the liquid exiting the thin jacket rises (see $t_{12.3}$ to $t_{13.5}$ in FIG. 6), and soon reaches an upper limit $T_M$ at which the burner is shut off. Applicant's experience is that this shut off occurs very soon after $t_{12.3}$ (e.g., at $t_{13.5}$, or 1.2 minutes after $t_{12.3}$ as shown in FIG. 6). In the situation depicted in FIG. 6, where one heating zone always has a thermal demand of 14,000 BTU per hour, such shut off occurs before the burner reaches the optimum stage, such that the carbon that built up in the combustion chamber during the start-up stage is not burned off because the optimum stage is not reached. Clearly, where the thermal demand is less than 14,000 BTU per hour (e.g., for heating small amounts of domestic hot water), the burner shut off occurs even sooner. If the thermal energy storage capacity of such burners is defined as the amount of thermal energy required to heat a given number of gallons of the gallons of the liquid through a selected temperature change $\Delta T$, then that thermal energy storage capacity is small. Additionally, during a normal duration purge stage, which may be 2.5 minutes, the burner chamber, the exhaust system and the thin jacket cool and are subject to thermal stresses from the repeated cooling of the structure, which decrease the operating life of the burner and the thin jacket.

Applicant has observed that as the two and one-half gallons of liquid continue to circulate through the single active zone (or less than all of the zones) and through the thin jacket during the purge stage, the liquid temperature rapidly decreases to a minimum operating temperature $T_L$ (e.g., in 2.3 minutes, as shown at $t_{13.5}$ to $t_{15.8}$ in FIG. 6) and the burner is turned on again. Since the BTU output of the burner is high relative to the BTU capacity of the liquid in the thin jacket and relative to the rate of heat transfer from the liquid-to-air heat exchangers of the active zones, the temperature of the liquid increases rapidly in time period $t_{15.8}$ to $t_{17}$ in FIG. 6 (1.2 minutes). The temperature of the liquid again reaches the high temperature limit $T_M$ in this short time period even though there is a 14,000 BTU per hour thermal demand. The burner is again shut off and cycled during the time period $t_{17}$ to $t_{19.3}$ through the abbreviated purge stage before the burner operates in the optimum stage. This cycle of start-up, too-short or no optimum stage operation and abbreviated purging continues, resulting in low burner efficiency, requirements for frequent cleaning of the combustion chamber and decreased burner life due to thermal stresses. Even if the difference between $T_M$ and $T_L$ were doubled to 30° F. to correspond to the example used in FIG. 7, it would take only 2.4 minutes of burner operation for the temperature to reach $T_M$.

In applicant's experience, attempts to lengthen the optimum burning stage have resulted in overall inefficiency of the system. For example, some vehicles having many zones for room air heating have used a diverter valve between the thin jacket and a return conduit from the liquid-air heat exchanger in the active zone. The valve is controlled to divert the liquid into a heat exchanger in the main power source, such as in the main internal combustion engine. Heat is lost in the main engine heat exchanger even though there may be no need to heat the main engine. This of course wastes heat, but lowers the temperature of the liquid that is input to the thin jacket, and thus increases the duration of the optimum stage of burner operation. Because this method of operating the supplemental burner depends on wasting the excess heat from the burner, it is not an acceptable way of increasing the length of the optimum stage of burner operation.

The method and apparatus of the present invention overcome the above-described rapid cycling of the supplemental burner without wasting the excess heat produced by the supplemental burner. In particular, the supplemental burner may operate at its rated thermal output, which may exceed the thermal demand of the active room air heating zones, yet the supplemental burner operates for an acceptably long, three-stage operational cycle (illustrated by $t_4$ to $t_{16}$ in FIG. 7). This is achieved by providing a substantially increased mass (and volume) of heat transfer liquid in heat transfer relationship with the combustion chamber of the supplemental burner. This increased mass (and volume) of liquid is heated by the supplemental burner to the maximum operating temperature $T_M$ to provide a reservoir of thermal energy. When there is demand for heat in a single zone, or in less than all of the zones of the room-air heat transfer system, or when there is only a small demand for domestic hot water, the thermal energy required to meet that demand (which is selected as 14,000 BTU per hour in the situation depicted in FIG. 7) is initially supplied by heat transferred from the reservoir of thermal energy. As this initial heat transfer occurs (see $t_{16}$ to $t_{37}$ in FIG. 7) from the thermal reservoir to the room air heat exchanger, or to the domestic water, the supplemental burner remains off. As a result, in one embodiment of the present invention 5100 BTUs are supplied by the thermal reservoir before the temperature of the heat transfer liquid in the thermal reservoir falls to the lower operational temperature, or low limit $T_L$. When that low limit $T_L$ is reached at the time $t_{37}$, the burner is turned on. Even if there is no additional demand for thermal energy for room air heating or for domestic water heating, the thermal load of the large mass and volume of heat transfer liquid, expressed in terms of the BTU requirement to heat the large mass and volume of heat transfer liquid back to the maximum operating temperature $T_M$, is enough that the supplemental burner must operate at its rated capacity for an acceptably long operational cycle, including an acceptably long optimum cycle. That operational cycle is shown in FIG. 7 as the time period $t_{37}$ to $t_{44.65}$, based on the use of fourteen gallons of heat transfer liquid in the thermal reservoir and a 40,000 BTU per hour rated capacity of the supplemental burner. The supplemental burner thus operates for about 7.65 minutes (time $t_{37}$ to time $t_{44.65}$) just to increase the temperature of the heat transfer liquid in the thermal reservoir from 150° F. ($T_L$) to 180° F., 180° F. being the maximum operating temperature $T_M$ of the thermal reservoir. With continued demand for heated room air or for domestic hot water, it would take longer than 7.65 minutes to satisfy the demand and to increase the temperature of the liquid in the thermal reservoir to the maximum operating temperature $T_M$. Thus, the supplemental burner would operate for a longer period of time in the optimum stage, which is the most efficient stage, and would burn the carbon off the inside of the combustion chamber. In addition to increasing the duration of the optimum stage of the burner's three-stage operational cycle, the 5100 BTUs of thermal energy that are stored in the thermal reservoir increase the ability of the system of the present invention to satisfy thermal demands that exceed the thermal output of the supplemental burner.

An object of the present invention is to increase the operating efficiency of an auxiliary burner.

Another object of the present invention is to provide a thermal reservoir heated by an auxiliary burner to provide a selected amount of thermal energy to meet demands for initially heating less than all of the zones in a zoned room air heating system without operating the auxiliary burner.

A further object of the present invention is to provide a thermal energy storage reservoir having a selected thermal capacity, where that thermal capacity is met by operating an auxiliary burner for a time period not less than its minimum desired operational cycle.

A still other object of the present invention is to provide a method of using an auxiliary burner to initially supply thermal energy to a thermal reservoir to increase its temperature to a maximum operating temperature, and to use that reservoir, and not the burner, to supply thermal energy to a room air and domestic water heating system until the temperature of the reservoir drops to a minimum operating temperature, at which time the auxiliary burner is operated for at least the duration of a minimum desired operational cycle to reheat the thermal reservoir to its maximum operating temperature.

A still further object of the present invention is to provide a thermal energy reservoir having a given thermal storage capacity, the reservoir being heated by an auxiliary burner having a minimum desired operational cycle that is of a selected minimum length at its rated thermal output, where thermal energy equal to that thermal storage capacity is provided to the reservoir by the auxiliary burner operating for no less than the duration of such minimum desired operational cycle.

With these and other objects in mind, the present invention is used with an auxiliary burner that provides supplemental thermal energy to a vehicle having a room or zone to be heated and domestic water to be heated. The auxiliary burner is designed to operate efficiently at a rated thermal output when it is operated for no less than the duration of a minimum desired operational cycle. A reservoir is provided for containing heat transfer liquid having a selected thermal energy storage capacity, measured by the amount of thermal energy required to heat the liquid from a lower or minimum operating temperature to a maximum operating temperature. The heat transfer liquid is in heat transfer relationship with the auxiliary burner and the thermal energy storage capacity is selected so that the auxiliary burner must operate at its rated thermal output for at least the duration of the minimum desired operational cycle to provide the selected thermal energy storage capacity to the reservoir.

In a method of the present invention, the reservoir containing the heat transfer liquid having the selected thermal energy storage capacity is initially heated by the auxiliary burner operating at the rated thermal output for at least the duration of the minimum desired operational cycle. With the heat transfer liquid in the thermal reservoir at the maximum operating temperature and with the burner off, heat is transferred from the thermal reservoir to meet the initial thermal demands for heated room air and domestic hot water. These demands decrease the temperature of the heat transfer liquid to the minimum operating temperature, whereupon the auxiliary burner is operated for at least the duration of the minimum desired operational cycle to raise the temperature of the heat transfer liquid to the maximum operating temperature. If during the operation of the auxiliary burner there are demands for thermal energy for heating room air or domestic water, the auxiliary burner is operated for a time period longer than the duration of the minimum desired operational cycle.

BRIEF DESCRIPTION OF THE DRAWINGS

Other objects, features and advantages of the present invention will be apparent from an examination of the following detailed descriptions, which include the attached drawings in which.

DETAILED DESCRIPTION

Vehicle 20

Figure 1:
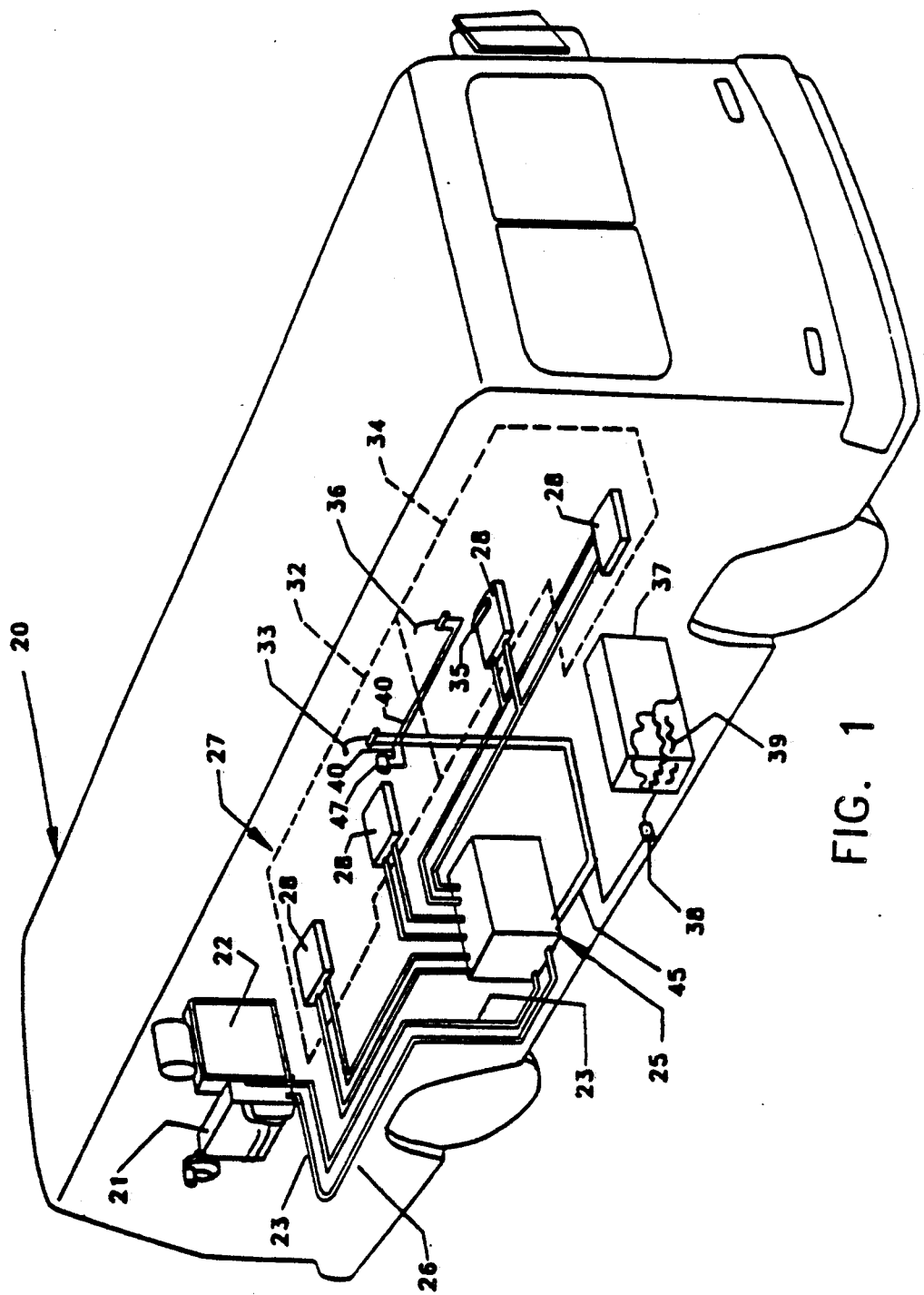
FIG. 1 is a perspective view of a vehicle provided with an auxiliary burner for providing supplemental thermal energy for room air, domestic water and main engine heating.

Referring to FIG. 1, there is shown a vehicle 20 that is designed to be propelled by a main engine 21. As described above, the vehicle 20 may also be in the form of a boat, in which even the main engine 21 propels the boat on the water. The vehicle 20 may also be a trailer that is towed by another self-propelled vehicle.

The main engine 21 may be an internal combustion engine or other type of engine having a liquid coolant system 22 for maintaining the main engine 21 at a desired operating temperature ($T_{EO}$). When the vehicle 20 is being propelled by the main engine 21, thermal energy is supplied via a conduit 23 that carries heated engine coolant 24 (FIG. 3) to an auxiliary thermal energy system 25. Cooled coolant 24 (FIG. 3) is returned to the main engine 21 via a return conduit 26. When the main engine 21 is not operating, the main engine 21 is maintained at a desired idle temperature ($T_{EI}$) by supplying heated engine coolant 24 from the auxiliary system 25 to the main engine 21 via the return conduit 26.

In the various forms of the vehicles, separate spaces or rooms 27 (illustrated by dashed lines in FIG. 1) are provided for various living or working activities. In each room, at least one liquid-to-air heat exchanger 28 is provided for heating the room air to a desired temperature ($T_A$). These heat exchangers 28 may be of the standard type sold under the trademark Aurora as motor home heaters. Heat transfer liquid 29 (FIG. 2) is supplied to the heat exchangers 28 from the auxiliary system 25 by separate supply conduits 30 and is returned to the auxiliary system by separate return conduits 31.

As shown in FIG. 1, one of the rooms 27 may be a bathroom 32 that is provided with a shower head 33. Another room 27 may be a kitchen 34 provided with a sink 35 and faucet 36. The shower head 33 and the faucet 36 are connected to a standard domestic water tank 37. As shown, a pump 38 provides pressure to supply domestic water 39 from the tank 37. The domestic water 39 is heated by the auxiliary system 25 and is supplied via hot water conduits 40 to the respective shower head 33 and the faucet 36.

Figure 2:
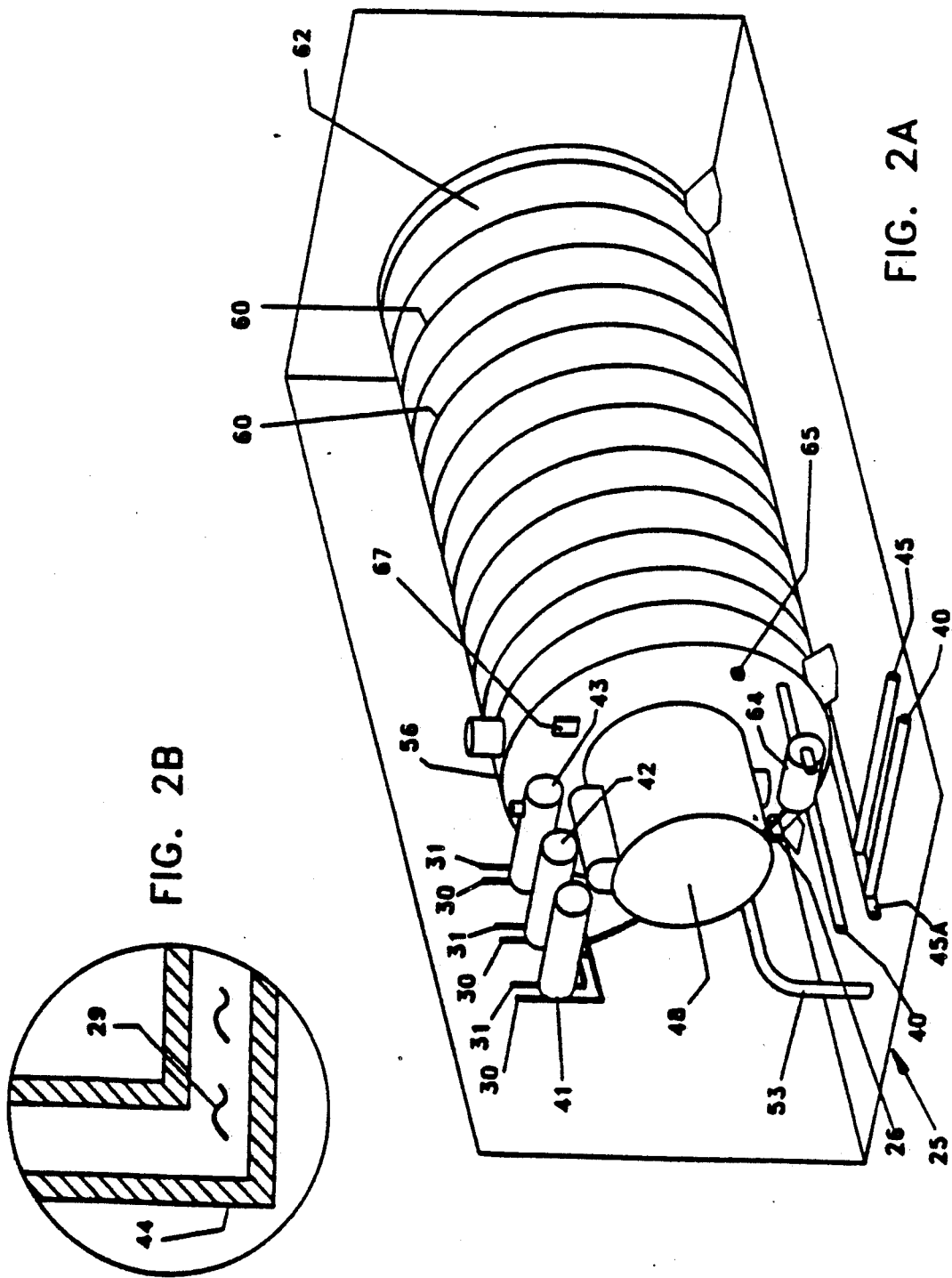
FIG. 2 is a perspective view of the auxiliary burner provided with a thermal reservoir of the present invention, wherein the thermal energy storage capacity of the reservoir is related to the duration of the minimum desired operational cycle of the auxiliary burner so that the auxiliary burner operates for at least that minimum duration regardless of the actual thermal demands to be met by the thermal reservoir.

Referring to FIG. 2, the supply and return conduits 30 and 31 respectively, that are connected to the room air heat exchangers 28 are shown connected to zone pumps 41, 42, and 43. A manifold conduit 44 (FIGS. 2 and 3) supplies heated heat transfer fluid 29 (FIG. 4) to the zone pumps 41, 42, and 43 from the auxiliary system 25. In a typical vehicle 20, a zone to be heated is defined by a room 27, and may have a thermal load of from 3000 to 8000 BTUs per hour. This load represents the thermal energy necessary to maintain the room air temperature in the room 27 at 75° F., for example, with an outside ambient temperature of from 0° to 50° F. In the aggregate, the thermal load of all of the rooms 27 of the vehicle 20 would typically be about 20,000 BTUs per hour.

Referring to FIG. 1, a cold water conduit 45 from the domestic water tank 37 is shown connected to the auxiliary system 25 to provide heated domestic water 39 (FIG. 1) in the hot water conduit 40 that is connected to the shower head 33, a lavatory 47 (FIG. 1) and the kitchen faucet 36. A mixing valve 45A (FIG. 2) is shown for blending hot domestic water 39 from the conduit 40 with cold domestic water 39 from the cold water conduit 45 to obtain a desired temperature of the hot domestic water 39 exiting the system 25. The typical demand for hot domestic water 39 is about 1.5 gpm for the shower head 33, the kitchen faucet 36 and the lavatory 47 at a temperature of 105° F., for example. If the cold domestic water 39 is stored in the tank at 55° F., for example, then the thermal load of that domestic water 39 would be about 40,000 BTU per hour.

BURNER 48

Referring to FIGS. 2-5, to supply the thermal load of such room air heat exchangers 28 and the domestic hot water 39, a vehicle 20 such as a "recreational vehicle," for example, is provided with the auxiliary system 25 having a peak thermal output of about 40,000 BTU per hour. The auxiliary system 25 may include a propane, gasoline or diesel-fired burner 48. In a preferred embodiment, the burner 48 is a Model DBW 2010 burner manufactured by Webasto AG having a thermal output of 11.6 kw (40,000 BTU/hr.). Such a burner 48 is normally shipped with a combustion chamber 49 (FIG. 5) in the form of a closed horizontal cylinder 50 having an air/fuel inlet 51 at one end 52 and an exhaust pipe 53 (FIG. 3) at the other end 54. The combustion chamber 49 of the burner 48 is about twelve inches long and has an o.d. of about six inches. A coolant jacket (not shown) of such burner 48 is a cylinder having a diameter typically one inch greater in diameter than that of the o.d. of the combustion chamber 49 (or seven inches) and a length of about twelve and one-half inches. Such a coolant jacket holds about 0.26 gallons of heat transfer liquid 29. As an example, the thermal energy storage capacity of that amount of liquid, measured as the amount of thermal energy required to heat 0.26 gallons of the liquid 29 ethylene glycol from 155° F. to 170° F. (a typical $\Delta T$ of $T_M - T_L$ in the prior art) is 36 BTUs. Such a burner 48 with the described coolant jacket (not shown) is typically operated with a liquid flow rate of 4.5 gpm and can provide an 18° F. gain in temperature ($\Delta T$) of the liquid 29 in one pass through the coolant jacket (not shown). It is to be understood then that such "thermal energy storage capacity" of that amount of liquid represents the amount of thermal energy in BTUs stored by that particular liquid with respect to such $\Delta T$. That amount of thermal energy is transferred from the particular liquid as the temperature of the liquid drops from 170° F. to 155° F.

Figure 6:
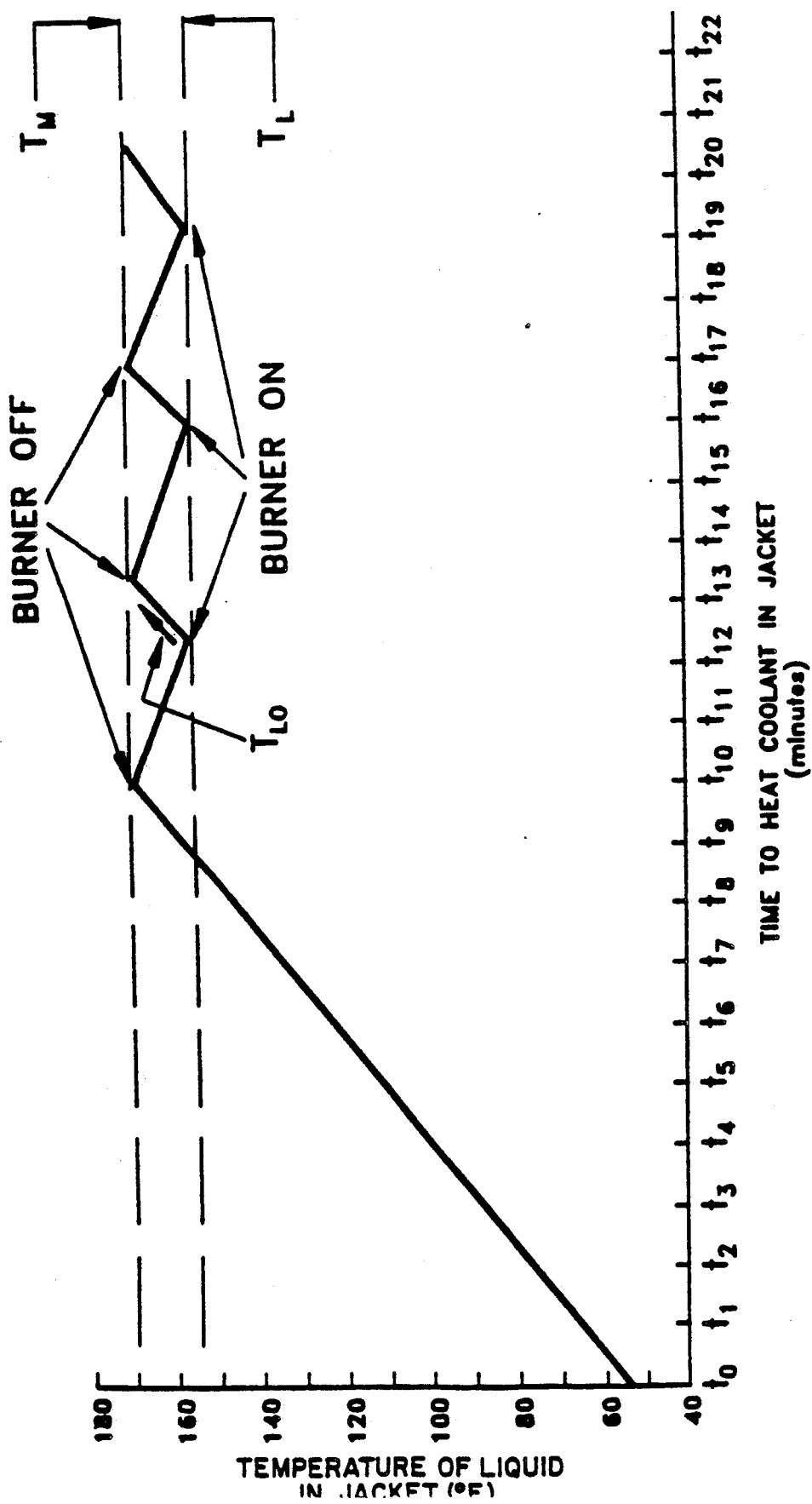
FIG. 6 is a graph showing temperature vs. time illustrating typical operational cycles of a prior art auxiliary burner, which cycles are of undesired length.
Figure 7:
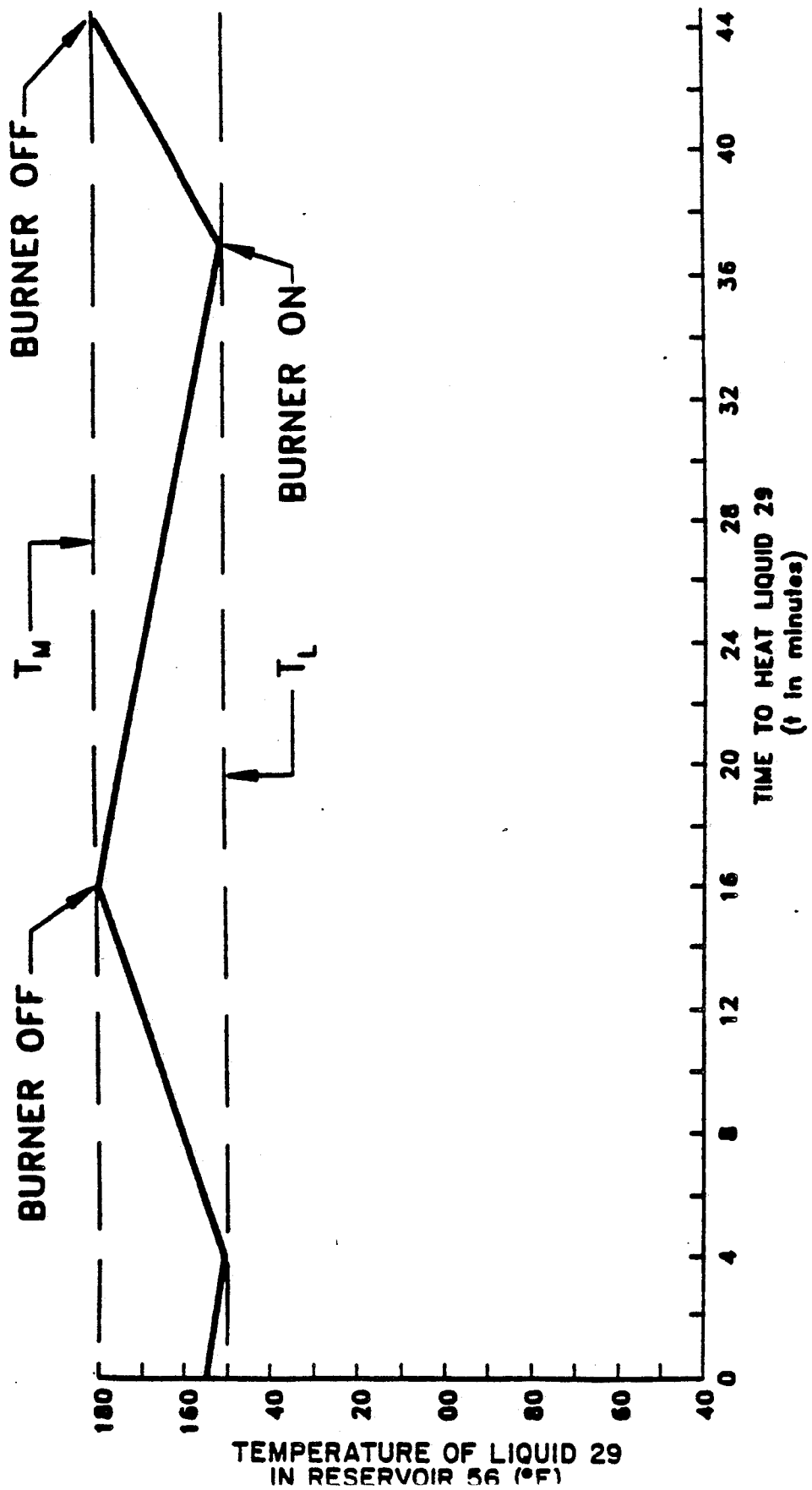
FIG. 7 is a graph of temperature vs. time illustrating typical operational cycles of a burner of the present invention, wherein those cycles exceed the duration of a minimum desired operational cycle of such burner.

In the use of burners 48 of the type illustrated by the Webasto Model DBW 2010, it has been the practice to recommend preferred operating parameters. Among these parameters is a preferred minimum desired operational cycle having a preferred minimum duration. This cycle includes the start-up stage described above, which includes starting the pump 41, 42, or 43 for the particular room air heating zone or room 27 and then starting combustion. As indicated above, the start-up stage also includes an initial portion of the period in which combustion occurs. In this initial portion, which may take three minutes, the burner 48 is not running at the intended efficiency because the combustion chamber 49 (FIG. 5) is heating up, for example. In FIGS. 6 and 7, for purposes of illustration, the thermal output of the burner 48 is considered as being the same during the initial stage and during the optimum stage. It is to be understood that such thermal output will be somewhat less during the initial stage.

Once the combustion chamber 49 (FIG. 5) has reached its operating temperature ($T_{BO}$), the combustion becomes complete according to design specifications of the burner 48. At this time, the carbon that was deposited on an inner wall 55 (FIG. 5) of the combustion chamber 49 starts to burn off. As the complete combustion continues, more of the carbon burns off, so that after a period of two minutes of optimum operation, the combustion chamber 49 is relatively clean and heat is more readily transferred across the wall 55 of the combustion chamber 49 to the heat transfer liquid 29. At this time, after an optimum stage of no less than about two minutes, the burner 48 may be turned off and the purge stage is completed in about two and one-half minutes to cool down the burner 48. Thus, the preferred minimum duration of the minimum desired operational cycle is about seven and one-half minutes in applicant's experience using the Model DBW 2010.

The thermal output of the burner 48, measured by the heat transferred to the heat transfer liquid 29 during the minimum desired operational cycle, is determinable and is referred to as the "rated thermal output for minimum desired operational cycle, " or "RTO." In the example of the Model DBW 2010, the RTO is about 3333 BTUs. This is obtained by multiplying the 40,000 BTU per hour rate of thermal output by the duration of the start-up and minimum desired optimum stage (three minutes, plus two minutes, respectively).

Auxiliary Thermal Energy System 25 of the Present Invention

To avoid the disadvantages of using the burner 48 with small volume liquid jackets (not shown) which are described above as having a liquid capacity such as 0.26 gallons, according to the principles of the present invention a standard burner 48, is modified by removing the small volume jacket. In its place, a substantially larger thermal reservoir 56 (FIGS. 2 and 4) is mounted around the combustion chamber 49 (FIG. 5) and contains a selected mass and volume of the heat transfer liquid 29, such as ethylene glycol. The rated thermal output of the burner 48 during the minimum desired operational cycle (or RTO) is known, as described above.

The desired operational temperature range ($\Delta T_R$, in °F.) of the heat transfer liquid 29 in the thermal reservoir 56 is selected based on the desired $T_M$ and $T_L$ for heat transfer purposes, where $\Delta T_R = T_M - T_L$. This is shown as 30° F. in FIG. 7. Knowing the specific heat (S.H.) of the liquid in BTUs per pound of liquid per degree F, the minimum weight of the liquid 29 is determined by solving the following equation for $W_L$, the weight of the liquid 29:

$$RTO = (\Delta T_R)(S.H.)(W_L) \quad (1)$$

$W_L$ can be expressed in other terms as that weight of heat transfer liquid 29 that is raised through a desired $\Delta T_R$ by the burner 48 operating for the duration of the minimum desired operational cycle at the rated thermal output of the burner 48.

As an example, in a preferred embodiment of the present invention using a Model DBW 2010 burner, the liquid capacity of the reservoir 56 is fifteen gallons and is filled with fourteen gallons of the liquid 29 to allow one gallon for expansion. The reservoir 56 is provided as a cylinder having an i.d. of sixteen inches and a length of eighteen inches, and surrounds the combustion chamber 49 of the burner 48. The reservoir 56 is fabricated from mild steel having a weight of about fifty-four pounds and a specific heat of one BTU/pound/°F. To minimize the weight $W_L$ of the heat transfer liquid 29 that is required, the thermal energy storage capacity of the reservoir 56 can be added to equation (1) as follows, where "S.H.$_M$" is the specific heat of the material from which the reservoir 56 is made, $\Delta T_M$ is the same as $\Delta T_R$ used in equation (1), and $W_R$ is the weight of the empty reservoir 56:

$$RTO = (\Delta T_R)(SH_L)(W_L) + (\Delta T_M)(SH_M)(W_R) \quad (2)$$

It is to be understood then, that the thermal energy storage capacity of the thermal reservoir 56 may be generally expressed in terms of Equation (1) and may be more particularly expressed in terms of Equation (2). In both cases, the amount of thermal energy stored in the reservoir 56 is equal to RTO.

The thermal reservoir 56 of the present invention is connected to the auxiliary system 25 in three ways. First, the manifold conduit 44 is connected to an outlet port 57 (FIG. 3) of the thermal reservoir 56 located toward the top of the thermal reservoir 56. The manifold conduit 44 supplies the heated liquid 29 to each of the three zone pumps 41, 42 and 43. A selected one or more of the pumps 41, 42 and 43 is operated to supply the heated liquid 29 to the heat exchanger 28 in the zone or room 27, such as the kitchen 34 to which the supply conduit 30 is connected. The liquid 29 exits the heat exchanger 28 and returns via the return conduit 31 to an inlet 58 (FIG. 4) at the bottom of the thermal reservoir 56.

Second, the domestic water 39 is supplied from the domestic water tank 37 by the pump 38. The cold water conduit or pipe 45 is connected to the pump 38 and supplies cold domestic water 39 (at 55° F.) to an inlet 59 (FIG. 4) of a coil 60 located at the bottom 61 of the thermal reservoir 56. The coil 60 is secured, such by brazing, in a serpentine path (FIGS. 3 and 4) or in a circular path (FIG. 2) to the outer side 62 of the thermal reservoir 56 so that the domestic water 39 in the coil 60 is in heat transfer relationship with the liquid 29 in the thermal reservoir 56. The pump 38 causes the domestic water 39 to flow through the coil 60 to the hot water line or conduit 40 that supplies the domestic hot water 39 to the kitchen faucet 36, the shower head 33 and the lavatory 47.

Third, the respective vehicle engine supply and return conduits 23 and 26 are connected to a respective coil 63 (FIG. 5) and an engine coolant pump 64 (FIG. 2). The pump 64 causes the engine coolant 24 to flow through the heat exchange coil 63 that extends through the liquid 29 in the thermal reservoir 56 and to the return conduit 26 to the main engine 21. If the main engine 21 is to be heated, the liquid 29 is in a desired range of from 150° F. to 180° F. If the liquid 29 in the thermal reservoir 56 is to be heated during operation of the main engine 21, the coolant 24 is at a higher temperature than that of the liquid 29 in the thermal reservoir 56, such as 190° F.

The auxiliary system 25 of the present invention is also provided with an electric heater 65 (FIGS. 4 and 5) to maintain the liquid 29 in the thermal reservoir 56 in a ready condition at the upper or maximum operating temperature ($T_M$) of 180° F. Since heat transfer occurs across insulation 66 around the thermal reservoir 56 and across the conduits 40, for example, thermal energy must be transferred to the liquid 29. The electric heater 65 has a rated capacity of 1500 Watts at 115 volts ac, which is sufficient to supply enough thermal energy to the liquid 29 to offset that lost by heat transfer across the insulation 66. A standard ac generator or power supply (not shown) is provided for supplying power to the heater 65.

Figure 3:
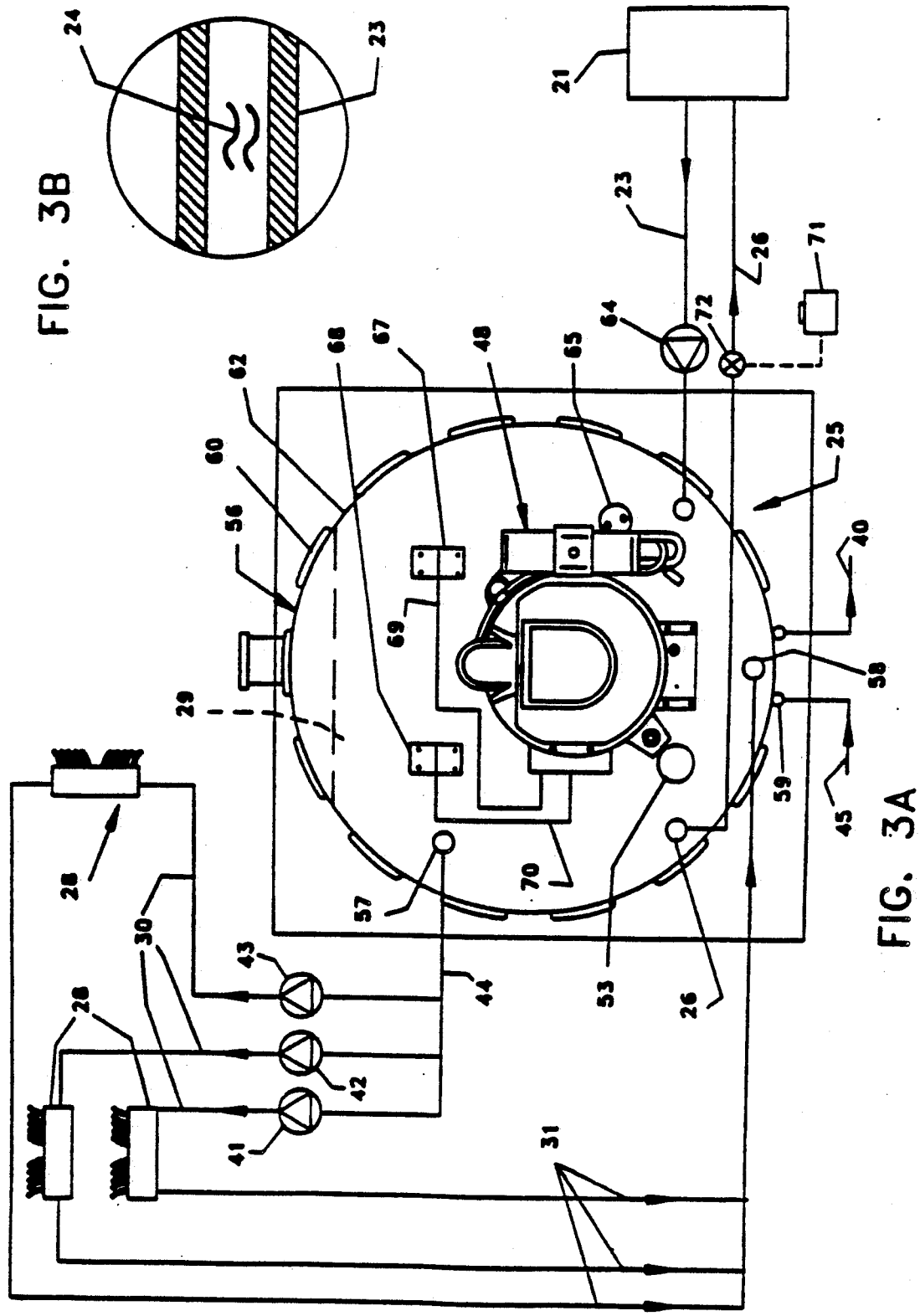
FIG. 3 is an end elevational view and schematic diagram of the conduits that are connected to the thermal reservoir of the present invention.
Figure 4:
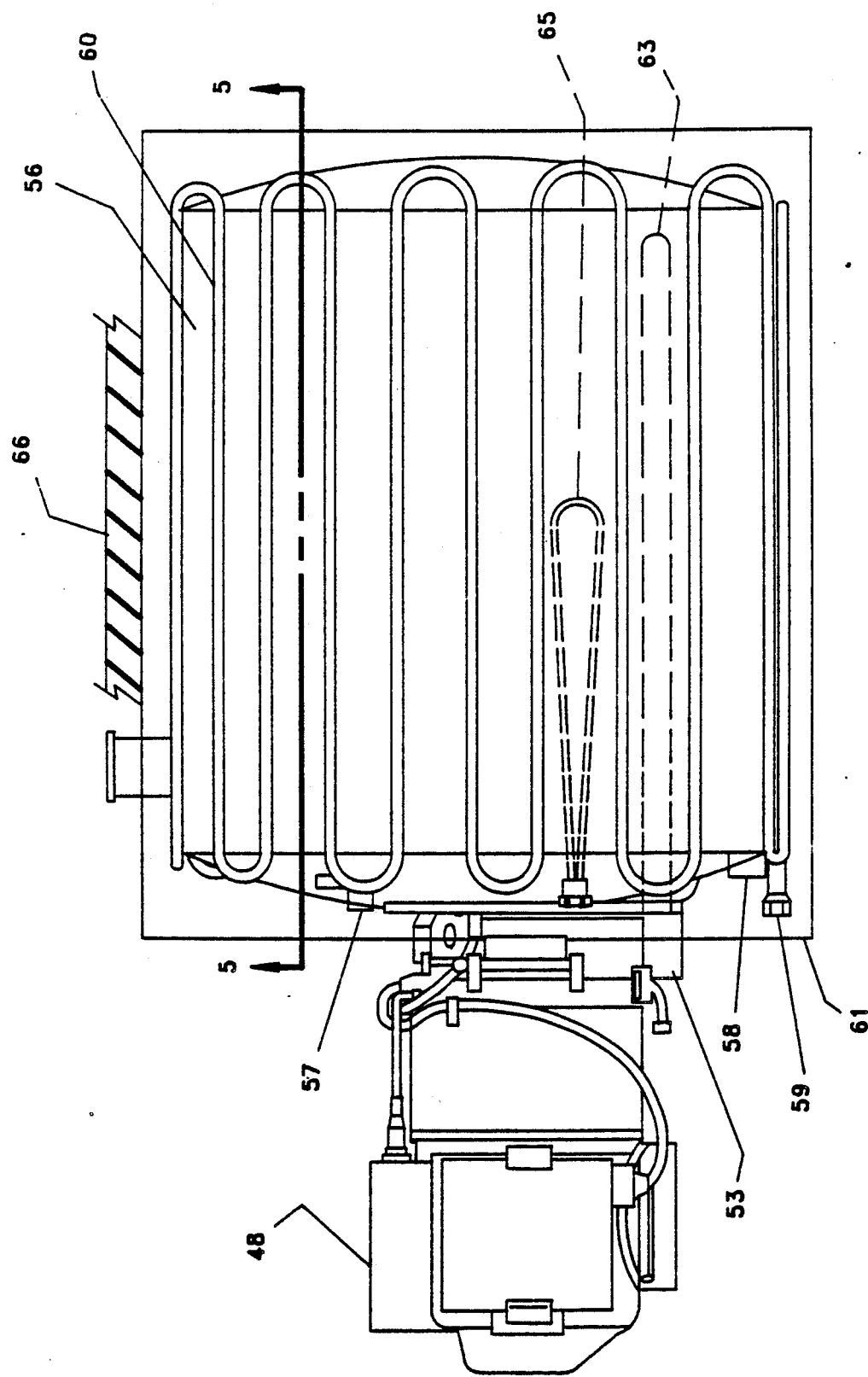
FIG. 4 is a side elevational view of the thermal reservoir shown in FIG. 3, illustrating a domestic water coil in heat transfer relationship with the thermal reservoir.
Figure 5:
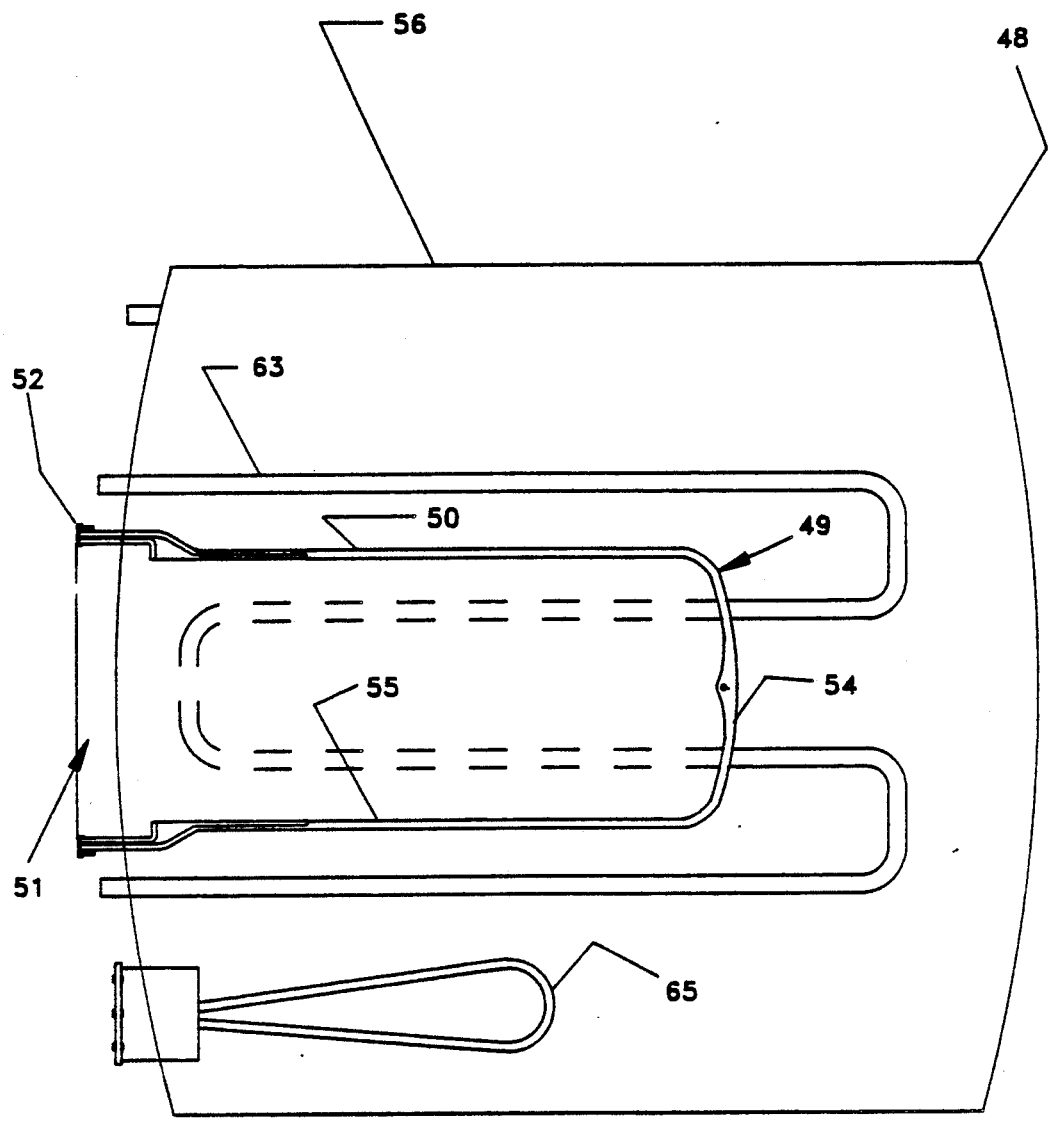
FIG. 5 is a cross-sectional view taken along lines 5—5 in FIG. 4 showing a coil in the thermal reservoir transferring thermal energy from or to heat transfer liquid from a main engine of the vehicle.

Referring to FIG. 3, the reservoir 56 is shown provided with first and second thermostats 67 and 68. The thermostats 67 and 68 extend into the heat transfer liquid 29 in the reservoir 56 for response to the temperature $T_R$ of the liquid 29. Each thermostat 67 and 68 may be a conventional Robertshaw thermostat which responds to the maximum temperature $T_M$ of the liquid 29 by opening a circuit 69 or 70 respectively. The circuit 69 is connected to the burner 48. When the circuit 69 is open, the burner 48 shuts off and the purge stage starts. In the example described above, the $T_M$ at which the thermostats 67 and 68 open the respective circuits 69 and 70 is 180° F. The circuit 70 is connected to the electric heater 65. When the circuit 70 is open, the power to the heater 65 is shut off.

Each of the thermostats 67 and 68 can also be set to close the respective circuits 69 and 70 (FIG. 3) in response to the liquid 29 having the lower limit temperature $T_L$. In the example described above, where $T_L$ is 150° F., the thermostat 68 for the electric heater 65 closes the circuit 70 in response to a temperature of 155° F. of the liquid 29, whereas the thermostat 67 closes the circuit 69 in response to a temperature of 150° F., which is $T_L$. In this manner, the electric heater 65 operates first in an attempt to provide thermal energy to the liquid 29 to offset heat lost across the insulation 66, for example. When the temperature of the liquid 29 drops to $T_L$, then the burner 48 is turned on and the temperature of the liquid 29 is increased to $T_M$ during the minimum operational cycle. Since the thermal output of the electric heater 65 is about 5118 BTU/hour, the electric heater 65 can be left on during the minimum operational cycle, with the 7.65 minute burner operational cycle being reduced to over 6 minutes, which exceeds the minimum desired operational cycle.

Thermal Reservoir 56

The method and apparatus of the present invention overcome the above-described rapid cycling of the supplemental burner 48 without wasting the excess heat produced by the supplemental burner 48. In particular, the supplemental burner 48 may operate at its rated thermal output, which exceeds the thermal demand of the active room air heating zones 27, yet the burner 48 operates during the minimum desired operational cycle. This is achieved by providing the substantially increased weight $W_L$ (or volume) of the heat transfer liquid 29 in heat transfer relationship with the combustion chamber 49 of the burner 48. The weight $W_L$ is determined by reference to equations (1) or (2) above. This increased weight $W_L$ of liquid 29 is heated by the supplemental burner 48 to the maximum operating temperature ($T_M$) to provide a reservoir of thermal energy (see time $t_{16}$ in FIG. 7). The thermal energy storage capacity of such reservoir of thermal energy is the RTO of the burner 48. When there is demand for heat in a single zone 27, or less than all of the zones 27 of the vehicle 20, or when there is only a small demand for domestic hot water 39, the thermal energy required to meet that demand is initially supplied by heat transferred from the reservoir 56 of thermal energy. As this initial heat transfer occurs from the thermal reservoir 56 to the room air heat exchanger 28, or to the domestic water 39, the supplemental burner 48 remains off. As a result, the entire thermal energy storage capacity of the liquid 29 in the reservoir 56 up to 5100 BTUs in the example given) can be supplied by the thermal reservoir 56 before the temperature of the heat transfer liquid 29 in the thermal reservoir falls to the lower limit or lower operating temperature ($T_L$). Further, when the weight $W_R$ of the material of the reservoir 56 is considered, as in equation (2), additional thermal energy is provided as that material cools to $T_L$. Thus, as the liquid 29 and the material of the reservoir 56 decrease in temperature from $T_M$ to $T_L$, the increased thermal energy storage capacity of the reservoir 56 results in providing thermal energy equal to the RTO of the burner 48.

When that limit $T_L$ is reached, the burner 48 is turned on. Even if there is no additional demand for thermal energy for room air heating or for domestic water heating, the thermal load of the large volume of heat transfer liquid 29 and the material of the reservoir 56, if it is considered, required to heat it or them back to the maximum operating temperature ($T_M$) is enough that the supplemental burner 48 must operate at its rated capacity for at least the duration of the minimum desired operational cycle, including an acceptably long optimum cycle (see times $t_{37}$ to $t_{44.65}$ in FIG. 7). As an example, with fourteen gallons of ethylene glycol as the heat transfer liquid 29 and a 40,000 BTU per hour rated capacity of the supplemental burner 48, the supplemental burner 48 operates for 7.65 minutes to increase the thermal reservoir temperature ($T_R$) from the 150° F. minimum operating temperature $T_L$ to the maximum operating temperature $T_M$ of 180° F. With continued demand for heated room air or for domestic hot water 39, it would take longer to satisfy that demand and to increase the temperature $T_R$ of the thermal reservoir 56 to the maximum operating temperature $T_M$. Thus, the supplemental burner 48 would burn longer in the optimum stage, which is the most efficient stage, and would burn the carbon off the inside of the combustion chamber 49. In addition to increasing the duration of the burner's optimum stage, the 5100 BTUs of thermal energy that are stored in the thermal reservoir 56 increase the ability of the system 25 of the present invention to satisfy thermal demands that exceed the thermal output of the burner 48.

METHODS OF THE PRESENT INVENTION

One aspect of the present invention relates to the selection of the burner 48 having a minimum desired duration operational cycle. The thermal output RTO of the burner 48 during that minimum operational cycle is determined. The liquid for the heat transfer liquid 29 is selected, which determines the specific heat S.H. in equation (1). The $\Delta T_R$ is then selected based on the required maximum operating temperature for heat transfer to the liquid 29 from the combustion chamber. Equation (1) is then solved for $W_L$ which determines the weight of the liquid 29 that is to be contained in the thermal reservoir 56. The thermal output RTO of the burner 48 is thus used to select the thermal energy storage capacity of the volume of heat transfer liquid 29 that is provided in the thermal energy storage reservoir 56. That thermal capacity is equal to the thermal output RTO of the burner 48 according to equation (1).

In another aspect of the method of the present invention, the reservoir 56 containing the heat transfer liquid 29 having the selected thermal energy storage capacity is initially heated by the auxiliary burner 48 operating at the rated thermal output for at least the duration of the minimum desired operational cycle. That duration of heating provides the thermal output RTO and results in heating the heat transfer liquid 29 in the thermal reservoir 56 to the maximum operating temperature $T_M$ with no thermal demands on the reservoir 56. With the heat transfer liquid 29 in the thermal reservoir 56 at the maximum operating temperature $T_M$, heat is transferred from the thermal reservoir 56 to meet thermal demands, e.g., for heated room air and domestic hot water 39. Since the thermostats 67 and 68 open the respective circuits 69 and 70 at temperatures above $T_L$, no thermal energy is supplied by the burner 48 to the heat transfer liquid 29 at this time. Thus, these demands decrease the temperature of the heat transfer liquid 29 to the minimum operating temperature $T_L$. The auxiliary burner 48 is then rendered operative when the thermostat 67 senses the liquid at $T_L$ and closes the circuit 69. The auxiliary burner 48 is operated for at least the duration of the minimum desired operational cycle to raise the temperature of the heat transfer liquid 29 to the maximum operating temperature $T_M$. If during the operation of the auxiliary burner 48 there are demands for thermal energy for heating room air or domestic water 39, the auxiliary burner 48 is operated for a time period longer than the duration of the minimum desired operational cycle, as shown in FIG. 7 by the time period between $t_4$ and $t_6$. When the temperature of the liquid 29 reaches $T_M$, the thermostat 67 causes the circuit 69 to open and the burner 48 is rendered inoperative, which is to say the optimum stage stops and the purge stage starts. The burner 48 remains off until the temperature of the liquid 29 drops to $T_L$ (see time $t_{37}$ in FIG. 7).

The demand for thermal energy can also result from a need to maintain the main engine 21 at the desired idle temperature $T_{EI}$. In this event, a switch 71 is closed to open a valve 72 and energize the engine coolant pump 64. The pump 64 circulates the engine coolant 24 from the return conduit 26 to the heat transfer coil 63 for the coolant 24. The coil 63 receives thermal energy from the heat transfer liquid 29 and heats the coolant 24. The coolant 24 is pumped through the supply conduit 23 to the main engine 21 where it circulates within and heats the main engine to the temperature $T_{EI}$.

When the main engine 21 is operating, the flow of coolant 24 can be reversed to provide heated coolant 24 to the coil 63 for heating the liquid 29. In the event that the thermal demand exceeds the thermal energy supplied by the heated coolant 24 in the coil 63, the burner 48 turns on when the thermostat 67 senses $T_L$ of 150° F.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A method of selecting heat transfer liquid for use in a burner of an auxiliary heating system, comprising the steps of:
   determining the thermal output of said burner during a minimum operational cycle of said burner;
   selecting heat transfer liquid having a thermal energy storage capacity equal to said thermal output of said burner; and
   providing said heat transfer liquid in heat transfer relationship with said burner.

2. A method of selecting the weight of heat transfer liquid to be contained in a thermal reservoir in heat exchange relationship with a burner that provides thermal energy, comprising:
   selecting the material to be used as said heat transfer liquid;
   determining the specific heat (S.H.$_L$) of said material of said liquid;
   selecting a temperature differential ($\Delta$ $T_R$) for heat transfer from said burner to said liquid;
   determining the thermal output (RTO) of said burner during the duration of a minimum desired operational cycle of said burner;
   selecting the material to be used as said thermal reservoir;
   determining the specific heat (S.H.$_R$) of said material for said reservoir;
   selecting the weight $W_R$ of said thermal reservoir; and
   determining the weight ($W_L$) of said liquid by solving the following equation for $W_L$:

$$RTO = (\Delta T_R)(S.H._L)(W_L) + (\Delta T_R)(S.H._R)(W_R).$$

3. The method of claim 1, in which:
   said step of selecting said heat transfer liquid includes selecting a given weight of said heat transfer liquid, selecting said heat transfer liquid having a particular specific heat, and selecting an operational temperature range over which said heat transfer liquid is heated during the minimum operational cycle.

4. The method of claim 1, comprising the following further steps of controlling the operation of said burner:
   with said heat transfer liquid initially at a maximum operational temperature and with said burner not operating, transferring heat from said heat transfer liquid to decrease the temperature of said heat transfer liquid to a minimum operational temperature; and
   operating said burner for a duration of not less than the duration of the minimum operational cycle to increase the temperature of the heat transfer liquid to the maximum operational temperature.

5. The method according to claim 1, further comprising the following step of controlling the operation of said burner:
   operating said burner in cycles of no less duration than the duration of the minimum operational cycle.

6. A method of selecting the weight of heat transfer liquid to be contained in a thermal reservoir in heat exchange relationship with a burner that provides thermal energy to said thermal reservoir, comprising:
   selecting the material to be used as said heat transfer liquid;
   determining the specific heat (S.H.$_L$) of said material of said liquid;
   selecting a temperature differential ($\Delta$ $T_R$) for heat transfer from said burner to said liquid;
   determining the thermal output (RTO) of said burner during the duration of a minimum desired operational cycle of said burner; and
   selecting the weight of said liquid by solving the following equation:

$$W = \frac{(RTO)}{(\Delta T_R)(S.H._L)}.$$

* * * * *